United States Patent [19]

Berglund

[11] Patent Number: 4,711,133

[45] Date of Patent: Dec. 8, 1987

[54] NON-CONTACT WEB TENSION METER

[76] Inventor: Per Roode Berglund, Musserongången 18, S-13534 Tyresö, Sweden

[21] Appl. No.: 862,351
[22] PCT Filed: Aug. 28, 1985
[86] PCT No.: PCT/SE85/00319
 § 371 Date: May 9, 1986
 § 102(e) Date: May 9, 1986
[87] PCT Pub. No.: WO86/01890
 PCT Pub. Date: Mar. 27, 1986

[30] Foreign Application Priority Data

Sep. 10, 1984 [SE] Sweden .................. 8404531

[51] Int. Cl.$^4$ .............................................. G01L 5/08
[52] U.S. Cl. .......................... 73/862.07; 73/862.45
[58] Field of Search ................. 73/37.5, 37.7, 37.6, 73/862.07, 862.45; 72/17

[56] References Cited

U.S. PATENT DOCUMENTS

| 3,201,985 | 8/1965 | Williams | 73/37.7 |
| 3,779,074 | 12/1973 | Breyer | 73/862.07 |
| 3,850,024 | 11/1974 | Ando et al. | 73/37.7 |
| 3,861,207 | 1/1975 | Barbee | 73/862.45 |
| 3,868,851 | 3/1975 | Breyer | 73/37.7 |
| 3,884,076 | 5/1975 | Studer | 73/37.6 |
| 4,070,902 | 1/1978 | Knobel | 73/37.5 |
| 4,106,330 | 8/1978 | Hinrichs | 73/37.7 |

Primary Examiner—Stewart J. Levy
Assistant Examiner—Hezron E. Williams
Attorney, Agent, or Firm—Pollock, Vande Sande & Priddy

[57] ABSTRACT

A web tension meter, particularly suited for measuring the tension in moving webs, e.g. paper in paper machines or a winding machine. The meter is based on the principle of supplying pressurized air through a passage (4) and a passage (11) to an outwardly open space (8) which is surrounded by a measuring opening in the form of an annular slot (9) coupled to a pressure gauge (via 5). The paper is allowed to pass in front of the openings (8, 9) at some millimeters distance therefrom. The measured pressure is quite surprisingly a linear, or near linear, function of the tension in the web.

6 Claims, 6 Drawing Figures

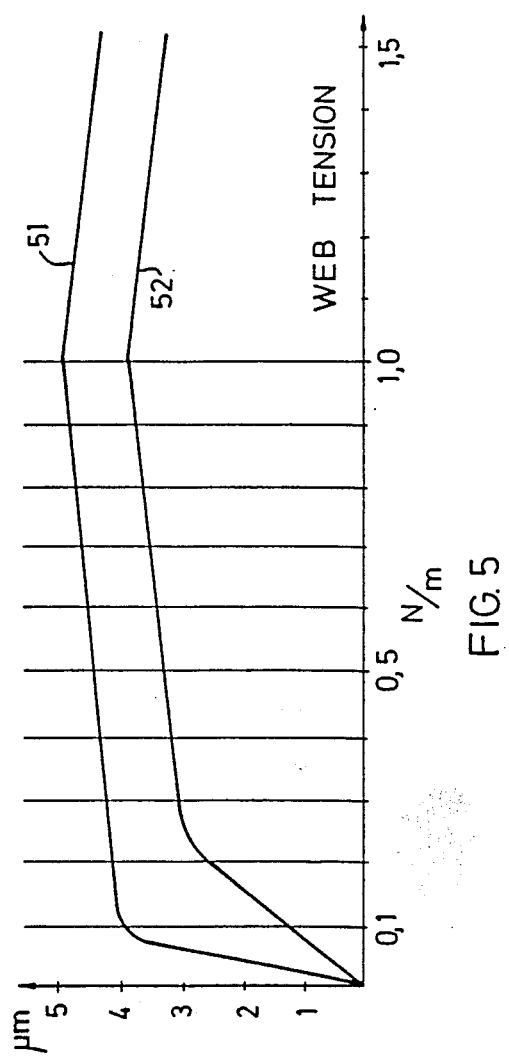
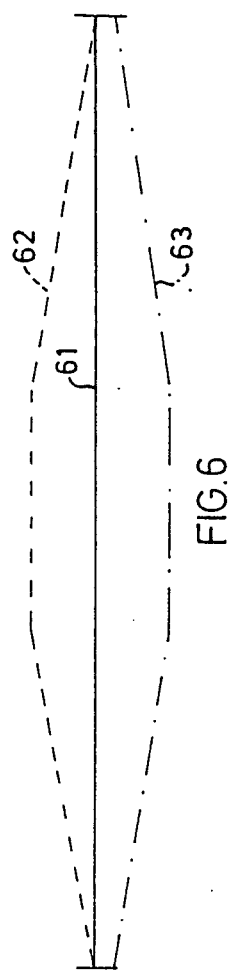
FIG. 5
FIG. 6

NON-CONTACT WEB TENSION METER

FIELD OF THE INVENTION

The invention relates to a meter for measuring the tension in moving webs.

PRIOR ART

The non-contact measurement of moving webs is known in the art and has been employed, for example, for regulating tension when winding paper onto reels and unwinding paper therefrom. Examples of this technique are found in U.S. Pat. No. 2,945,637. In accordance there with, the web is drawn in a curved path over a perforated curved plate through the holes of which air is blown so as to produce a kind of air-cushion bearing between the plate and the paper. The greater the tension in the paper, the less air is consumed, so that the air pressure increases inwardly of the perforated plate. A similar arrangement is known from the Swedish Pat. No. 207 513, although in this case the pressure is measured via one or more measuring apertures located in the wall in which the air-exhaust orifices are seated, so that it is possible to measure the web tension at a number of positions across the width of the web.

These known non-contact web-tension measuring apparatus, however, have the disadvantage that it is necessary to change the direction of the web, by drawing the same over a plate or like element, admittedly while supporting the same on an air cushion and therewith in a manner which is contactless at least in principle, but not reliably so in practice. Although, as far as the arrangement disclosed in the aforesaid Swedish patent is concerned, it is possible to measure web tension at mutually different locations across the width of the web, these measurements can only be taken at fixed locations determined by the construction.

SUMMARY OF THE INVENTION

It is an object of the invention to provide a non-contact web tension meter which can be placed against a web without needing to change the direction of the web, and the position of which, can be freely moved to any part of the web whatsoever across the breadth of the web, and which is therewith suitable for incorporation in a transversable measuring head, for co-action with other measuring devices operative in measuring thickness, moisture content and other variables of interest with regard to process controls and quality controls. The measuring process shall preferably provide a linear or substantially linear result.

In explanation of this object, it may be mentioned that during his work with thickness gauges for measuring the thickness of moving paper webs, the present inventor discovered that the thickness of a paper web, at least when measured in a contactless manner or with low surface pressure, surprisingly changes when a change in web tension occurs. One might presume that an increase in tension would result in a thinner paper, due to transverse contraction. What was found during experimentation, however, was something far more complicated, a matter which, moreover, is contingent on the kind of thickness gauge or meter used. When a non-contact meter of the kind disclosed in Swedish Published Application No. 434 997 is used, stretching of the web will initially result, in the case of newsprint, in the measured thickness increasing by 3-4 micron (force 0-0.2 N/m) and then increasing more gradually by some further microns (force 0.2-1.0 N/m), and only when this point is reached, decreasing when tension is increased. This effect is apparently due to the "pile" of the paper rising as the paper is placed under tension. Consequently, in order to obtain a true value in respect of the thickness of the paper, it is necessary to know the tension therein, in order to make a suitable correction. Newsprint can have a standard thickness of 80 microns, and it is desirable to be able to maintain control of this thickness to within about one or two microns, or better. In addition, it should be noted that contacting thickness meters have an even greater dependency on web tension than do present day non-contacting thickness meters.

Measurements of the web tension, correlated with other measurements, is desirable in continuous manufacture control processes, for controlling a paper machine. This control is normally effected by heating a roller located in the machine to varying degrees of temperature at different locations along the length of the roller, to achieve a uniform thickness. A web of uniform thickness is a requirement from the printers. Data relating to the web tension is also important when the paper is to be wound on reels, and there is reason to suspect that irregularities in the tension of the wound web are the cause in many cases of unforeseen web fractures when, for example, printing newsprint. A paper roll which has been wound properly with respect to web tension is also less likely to become nonround.

The aforementioned objects and advantages are achieved in accordance with the invention by means of a non-contact web tension meter of a telescopic construction controlled by pressurized gas, such as to be withdrawn when pressure gas falls away. In a preferred embodiment, the meter can be extended telescopically only when the pressure exceeds a given minimum pressure. In a further improvement in this respect, and an improved function during a measuring operation, the width of the pressure aperture is small in relation to the width of the web and preferably not greater than one-twentieth thereof, and it is suitable to permit solely the lips which define the pressure aperture and the measuring aperture, to face towards the web.

BRIEF DESCRIPTION OF THE DRAWINGS

For purposes of illustration, the invention will now be described with reference to an embodiment thereof illustrated in the accompanying drawings.

FIG. 5 illustrates variations in thickness with web tension in respect of two mutually different papers.

FIG. 6 illustrates the effect of a correction made to a paper profile without taking web tension into account.

DESCRIPTION OF PREFERRED EMBODIMENT

Figure 1:
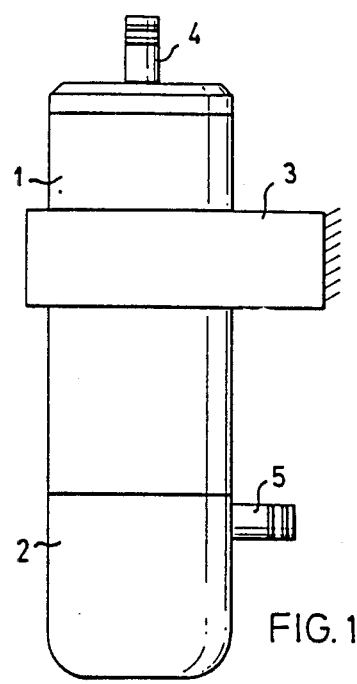
FIG. 1 is a side view of a web tension meter.
Figure 2:
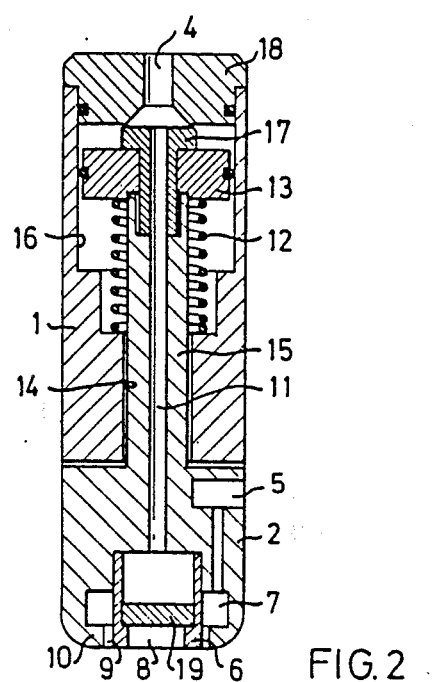
FIG. 2 illustrates the same web tension meter in cross-section.

FIG. 1 is a schematic side view of a web tension meter according to the invention. Seated in a holder 3 is a measuring head, which is substantially of cylindrical shape and has a diameter of 30 mm. A pressurized air inlet is shown at 4, and a pipe 5 is connectable to a pressure meter. Such pressure meters are known to the art in many variations. In the illustrated embodiment there has been used a low pressure transducer designated Mod. 261 from Setra Systems, 45 Nagok Park, Acton, Mass., USA. As clearly shown in FIG. 2, the measuring head is divided into two parts, a stationary part 1 and a movable part 2, these parts moving telescopically relative to one another. The stationary, upper part is hollow and has a narrow opening 14 and a wider opening 16 and a cap 18, through which the pressurized-air pipe 4 extends. The movable part comprises a nozzle part which is firmly mounted on a stem 15 fitting in the opening 14 and the other end of which carries a piston 13 which fits in the wider opening 16. A compression spring 12 is mounted so as to tend to draw the stem 15 inwardly to the position shown in FIG. 2. An air passage 11 extends through the stem, up to the nozzle part, and is terminated in one direction in a sealing ring 17, which is located on the upper side of the piston and which, in the illustrated position, seals against the inner surface of the cap 18, around the air inlet hole 4.

It will be seen that the piston 13 when occupying the illustrated position will not be affected by the pressurized air introduced until the pressure is of such magnitude as to free the sealing ring 17 from the cap 18, against the action of the spring 12.

The passage 11 opens into the outwardly open space 8, via a coarse sintered plate 19. The sintered plate contributes in holding up the pressure in the passage 11, so that sufficient pressure is obtained through the supply of pressurized air for pressure to be exerted over the whole of the upper surface of the piston 13, whereafter the piston forces the movable part 2 out to a working position, (not shown).

When using the meter to measure the tension in a web, the web is brought into position for abutment and, in use, is spaced at a distance of approximately 1 mm from the lower portion of the movable part 2 and forms a defining wall of the space 8. Extending around the space 8 is an annular chamber 7 with an annular measuring slot 9, outwardly defined by a lip 10. When the space 8 is pressurized to a pressure of 0.5-1 bar, the yielding web will move away to a greater or lesser extent, depending upon the tension prevailing in the web. The pressure measured in the pressure gauge connected to the measuring slot 9 through the passage 5 will vary with web tension. The measuring result, on the other hand, is not particularly influenced by the pressure of the input air, and hence quite primitive pressure control devices will suffice.

It might be possible to guess beforehand that such a dependency is to be expected, by relatively elementary considerations. However, the fact that this effect is found to be linearly, or substantially linearly, dependent on the web tension, rendering the invention well suited for the aforesaid measuring function, is likely to surprise one of ordinary skill in this art.

Figure 3:
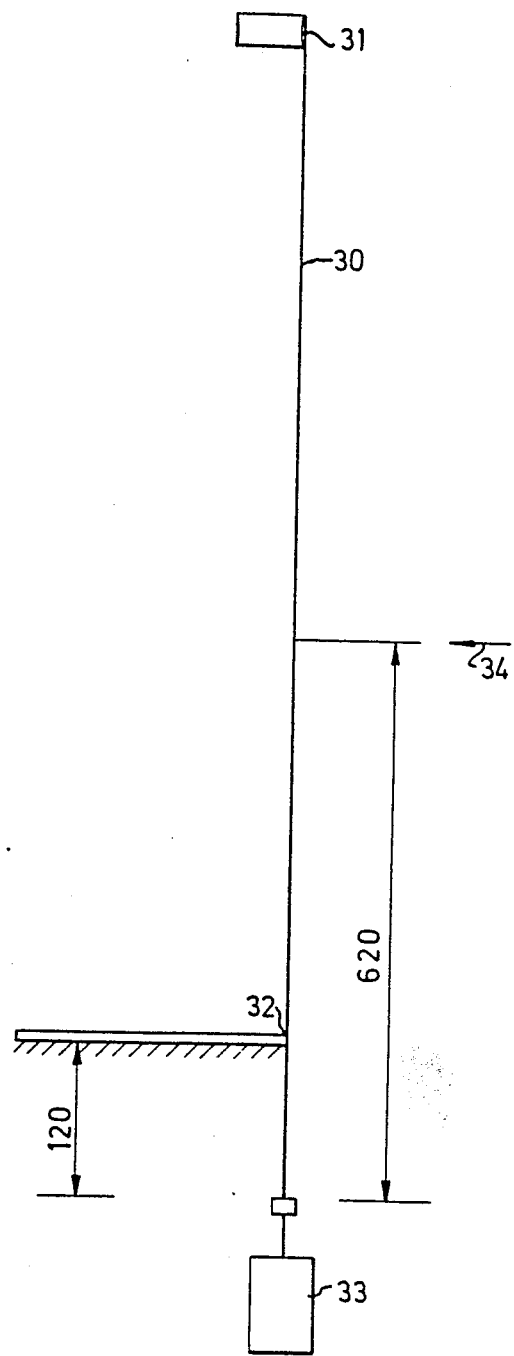
FIG. 3 illustrates a stationary testing station.
Figure 4:
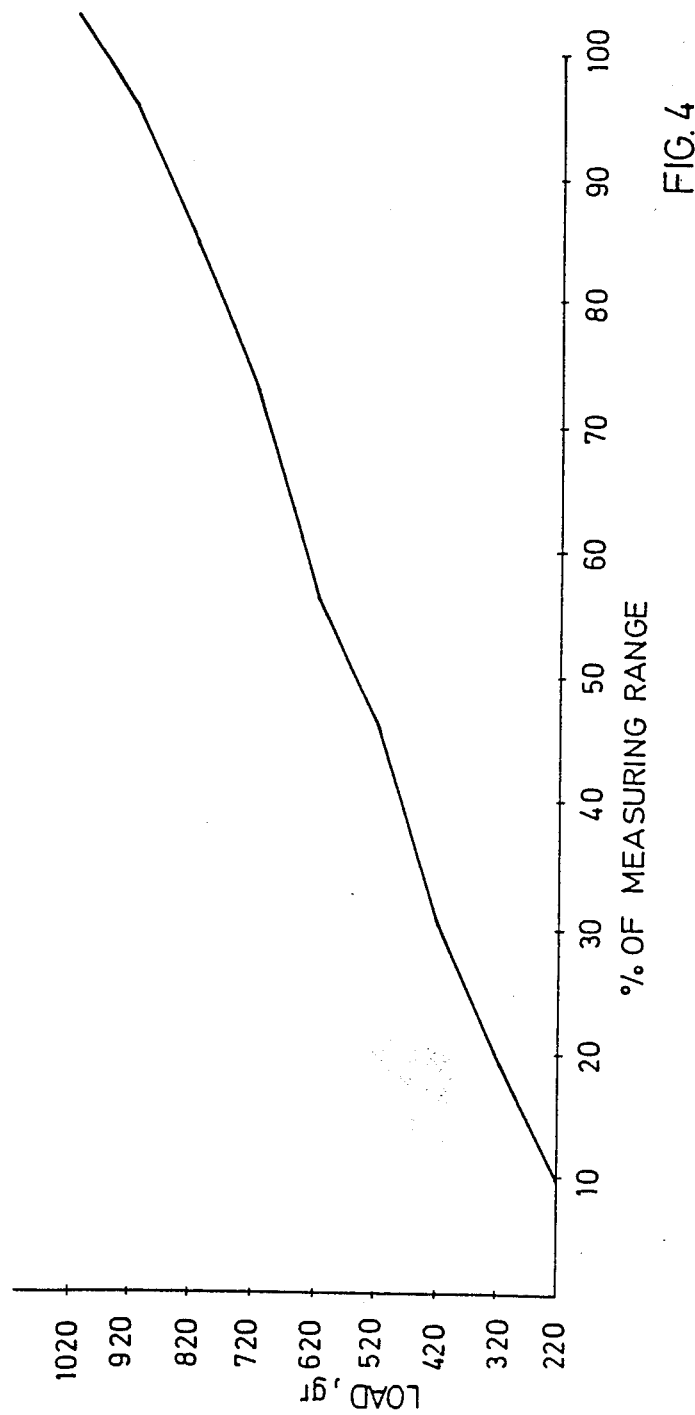
FIG. 4 illustrates a test result obtained in the testing station shown in FIG. 3.

This linearity has been determined experimentally. In one experiment a strip of paper 30 (type newsprint) having a length of 2 m and a width of 440 mm was hung vertically between two supports 31 and 32, and was loaded with a container 33 into which water could be poured. With the container empty, the tension corresponded to a load of 220 grams. A web tension meter 34 was placed against the surface of the paper. The geometry will be seen from FIG. 3, in which the measurements are in millimeters. The result obtained with this arrangement is shown in FIG. 4, where the values in percentage of a full-scale reading on the pressure meter used are plotted on the X-axis. The curve obtained was practically linear.

It will be understood that the force conditions are not entirely simple, since the arrangement functions with a flowing gas. It will be perceived that there prevails in the space 8 (FIG. 2) a static pressure which, quite naturally, will force the paper outwardly, away from the measuring head. The air, however, simultaneously, laterally in the gap formed between the head and the paper web, creating a vacuum force in accordance with Bernoulli's law, which strives to draw the paper towards the head. The measured pressure is influenced by this subpressure. That the result of these different effects brings about a result which is a linear, or substantially linear function of the web tension, is apt to cause surprise, as is also the fact that the measuring result depends so little on the applied pressure, within wide limits.

Tests have also been carried out with moving webs, with paper wound from one roll to another. As far as could be determined, the measuring result is not influenced by the speed at which the web moves. In this arrangement, the web forms, at a location opposite the head, a little pronounced "valley", having a length in the feed direction of some twenty centimeters and a width which slightly exceeds the width of the head.

In order to illustrate the particular problem within the paper industry where the invention affords a solution, reference is made to FIG. 5, which shows the change in paper thickness in microns as a function of web tension. The curves 51 and 52 show the results obtained with tests carried out on newsprint obtained from two different Swedish paper mills. The difference is not one of chance; on the contrary, paper samples obtained from the two mills consistently each exhibit its particular curve form. It will be seen that; when stretching, there is a rapid increase in thickness succeeded by a more gradual increase in thickness with a further increase in the tension, finally followed by a decrease in thickness for web tensions above about 1 N/m. It is apparent that no accurate measurement of the thickness of paper webs is possible when they are tensioned, unless the effect of the web tension is corrected for.

FIG. 6 illustrates the effect of a thickness measurement which is impaired by errors due to failure to compensate for web tension. FIG. 6 shows along the X-axis the width of a paper web which is assumed to be initially of uniform thickness, i.e., which does not deviate from a desired standard thickness. This standard uniform thickness is shown by the line 61. A variation in web tension exists, however, across the width of the web, shown by the broken line curve 62, which is quite representative, since web tension is often lower at the edges of the web. If the thickness of the web is now measured, the value obtained will be in error, the paper being found thicker in the center of the web. When correcting this supposed error until a uniform thickness is found in the thickness meter, there will actually be obtained a manufactured paper having a true thickness curve which exhibits the deviation shown by the chain line 63.

As to the accuracy aspect of thickness measurements, the following can be said. Standard newsprint has a thickness of roughly 80 microns. Newsprint which exhibits variations in thickness in the order of 10 microns is considered to be second-rate, and a standard manufacturing tolerance is at present 2 microns. Variations in thickness are significant with respect to both the quality of the print obtained and to the risk of web fracture. High accuracy measurement of web thickness during manufacture would be highly beneficial in producing a unifom dry weight of the paper across the whole of its breadth. At present, it is necessary, instead, to make corrections by drying the web to varying degrees at different locations across the width, so as in this way to reduce the variations in thickness when calendering the formed paper. The varying magnitudes of moisture content of the finished paper rolls are economically disadvantageous to the paper mill, which, by applying better controls—solely possible by improved thickness measurement—could reduce the consumption of raw materials for each ton of paper produced without loss of quality. Winding of newsprint into rolls (diameter 2 m) can also be controlled in an improved manner, and a suitable tension distribution obtained, all by accurate measurement of the tension of the web. There is a well-founded general suspicion that poor lateral distribution of the web tension profile is an essential source of web fracture in printing shops.

What is claimed is:

1. A non-contact web tension meter for measuring the tension of a web of material having a breadth and drawn under tension between two guide means, said meter incorporating means for supplying a pressurized gas to a space therein which is open in one direction and which is delimited by one side of said web placed in close proximity to said space, and a pressure gauge adapted to measure the gas pressure near said web at a side of said space, said meter being freely movable across the breadth of said web, and comprising a holder (3), having a measuring head attached to said holder and incorporating a pressurized-gas inlet (4), a gas passage (11) connected to said inlet and extending to said space (8), and an annular chamber (7) surrounding said space (8), and having an annular opening (9), said space (8) and said opening (9) terminating adjacent an end plane in said measuring head, and said annular chamber being connected to a pressure sensor.

2. A non-contact web tension meter according to claim 1, wherein said measuring head has first and second parts which are telescopically movable in relation to one another, said first part (1) being fixed to said holder (3) and carrying said pressurized-gas inlet (4), and said second part (2) presenting said open space (8), which is intended to be placed under pressure, and said annular chamber (7), said first and second parts functioning as a piston and a cylinder, respectively, for moving the same mutually apart, against the action of a spring (12), upon introduction of said pressurized gas.

3. A non-contact web tension meter according to claim 1, comprising a stem (15) mounted on an end of said second part (2) remote from said end plane of said measuring head, said gas passage (11) extending through said stem and terminating with a piston (13) whose diameter is grater than that of said stem, said first part (1) having a first, elongated opening (14) for accommodating said stem, a second opening (16) being located in an extension of the stem (15) and being adapted to accommodate said piston (13), said spring (12) being a compression spring arranged in the second opening between said piston (13) and said first opening (14), said gas passage (11) terminating at the end of said piston (13) opposite said spring (12) with an annular seal (17) in sealing abutment with said pressurized-gas inlet (4), an exit orifice of which is located in a wall (18) defining said second opening.

4. A non-contact web tension meter according to claim 3, comprising a throttling plate (19) arrangement between said passage (11) and said space (8) to be pressurized.

5. A non-contact web tension meter according to claim 4, wherein said throttling plate (19) is a sintered plate.

6. A non-contact web tension meter according to claim 1, wherein the opening of said space (8) to be pressurized is arranged to take up less than one-twentieth of the width of the web to be measured, and is defined by a first lip (6) towards said annular opening (9), which in turn is defined outwardly by a second lip (10), said first and second lips jointly defining said annular opening (9), that side of said measuring head (2) facing said web solely comprising the surface formed by said two lips.

* * * * *